US008868335B2

(12) United States Patent
Nowak et al.

(10) Patent No.: US 8,868,335 B2
(45) Date of Patent: Oct. 21, 2014

(54) METHOD OF CREATING MAP DATA

(75) Inventors: Hubert Nowak, Piotrkow Trybunalski (PL); Rafal Jan Gliszczynski, Lodz (PL)

(73) Assignee: TomTom Polska Sp. z.o.o., Warsaw (PL)

( * ) Notice: Subject to any disclaimer, the term of this patent is extended or adjusted under 35 U.S.C. 154(b) by 219 days.

(21) Appl. No.: 13/392,552

(22) PCT Filed: Jun. 9, 2010

(86) PCT No.: PCT/EP2010/058103
§ 371 (c)(1),
(2), (4) Date: May 2, 2012

(87) PCT Pub. No.: WO2011/023427
PCT Pub. Date: Mar. 3, 2011

(65) Prior Publication Data
US 2012/0209518 A1 Aug. 16, 2012

Related U.S. Application Data

(60) Provisional application No. 61/236,547, filed on Aug. 25, 2009.

(51) Int. Cl.
*G01C 21/32* (2006.01)
*G06T 15/40* (2011.01)
*G01C 15/00* (2006.01)
*G09B 29/10* (2006.01)

(52) U.S. Cl.
CPC ............... *G09B 29/10* (2013.01); *G06T 15/40* (2013.01); *G01C 15/002* (2013.01); *G01C 21/32* (2013.01)
USPC .......................................... 701/450; 701/445

(58) Field of Classification Search
USPC .................................. 701/411, 445–450, 451
See application file for complete search history.

(56) References Cited

U.S. PATENT DOCUMENTS 6,047,234 A * 4/2000 Cherveny et al. ............. 701/451
6,366,851 B1 * 4/2002 Chojnacki et al. ............ 701/468
(Continued)

FOREIGN PATENT DOCUMENTS

JP 2002318533 A * 10/2002 ............. G09B 29/00
JP 2003345237 A * 12/2003 ............. G09B 29/00
(Continued)

OTHER PUBLICATIONS

JPO machine translation of JP 2005-62854 (original JP document published Mar. 10, 2005).*
(Continued)

*Primary Examiner* — Behrang Badii
*Assistant Examiner* — David Testardi

(57) ABSTRACT

A computerised method of creating map data from a plurality of trips where each trip comprises position data derived from the positions of at least one navigation device 200 over a period of time, the method comprising using a processing circuitry to perform the following steps: i. processing the position data; ii. determining from the processing the believed accuracy of the position data constituting a trip; iii. reducing the weight applied to and/or removing position data in which the belief is below a predetermined threshold to generate filtered position data; iv. deriving information about the road 700 based upon the filtered position data; and v. generating further map data.

11 Claims, 6 Drawing Sheets

(56) References Cited

U.S. PATENT DOCUMENTS

| | | | |
|---|---|---|---|
| 6,381,533 B1* | 4/2002 | Crane et al. | 701/446 |
| 6,385,539 B1* | 5/2002 | Wilson et al. | 701/468 |
| 6,549,846 B1 | 4/2003 | Dance et al. | |
| 6,560,531 B1* | 5/2003 | Joshi | 701/446 |
| 6,674,434 B1* | 1/2004 | Chojnacki et al. | 345/428 |
| 6,850,841 B1* | 2/2005 | Casino | 701/461 |
| 6,856,897 B1* | 2/2005 | Phuyal et al. | 701/461 |
| 7,035,733 B1* | 4/2006 | Alwar et al. | 701/409 |
| 8,073,617 B2* | 12/2011 | Nakamura | 701/450 |
| 8,170,786 B2* | 5/2012 | Zohar et al. | 701/300 |
| 8,195,393 B2* | 6/2012 | Bhatt | 701/475 |
| 8,314,718 B2* | 11/2012 | Muthaiah et al. | 340/903 |
| 8,359,156 B2* | 1/2013 | Guo et al. | 701/411 |
| 8,725,404 B2* | 5/2014 | Kmiecik et al. | 701/400 |
| 2005/0162309 A1 | 7/2005 | Humphries et al. | |
| 2008/0262721 A1 | 10/2008 | Guo et al. | |
| 2010/0191461 A1* | 7/2010 | Zeng | 701/208 |
| 2010/0305850 A1* | 12/2010 | Krumm et al. | 701/208 |
| 2012/0004845 A1* | 1/2012 | Kmiecik et al. | 701/445 |

FOREIGN PATENT DOCUMENTS

| | | | | |
|---|---|---|---|---|
| JP | 2005062854 A | * | 3/2005 | G09B 29/00 |
| JP | 2008164373 A | * | 7/2008 | |
| WO | 2009059766 A1 | | 5/2009 | |
| WO | 2010040404 A1 | | 4/2010 | |

OTHER PUBLICATIONS

Schroedl, Stefan, et al., "Mining GPS traces for map refinement", Data Mining and Knowledge Discovery, 9, 2004, pp. 59-87, downloaded from http://www.litech.org/~wkiri/Papers/schroedl-gps-04.pdf.*

Williams, Richard, "Confidence intervals", Google date: Sep. 7, 2004, 6 pages, downloaded from https://www3.nd.edu/~rwilliam/stats1/x23.pdf.*

Yale Statistics 101 course materials, "Confidence Intervals", Internet Archive date: Oct. 3, 2000, 4 pages (and 4 page Internet Archive record), downloaded from http://www.stat.yale.edu/Courses/1997-98/101/confint.htm.*

Search Report issued Feb. 25, 2011 for GB Application No. GB1100280.5.

* cited by examiner

METHOD OF CREATING MAP DATA

CROSS REFERENCE TO RELATED APPLICATIONS

This application is the National Stage of International Application No. PCT/EP2010/058103, filed Jun. 9, 2010 and designating the United States. The application claims priority from U.S. Provisional Application 61/236,547 entitled "Method for Extraction of Community Input Data" with a priority date of Aug. 25, 2009. The entire content of both applications is incorporated herewith by reference.

FIELD OF THE INVENTION

The invention relates to a method of processing positioning data and in particular to processing positioning data in order to generate map data arranged to be used in navigation devices and in particular, but not especially in a Portable Navigation Device (PND). The invention also provides related apparatus for providing the method.

BACKGROUND TO THE INVENTION

Map data for electronic navigation devices, such as GPS based personal navigation devices like the GO™ from Tom-Tom International BV, comes from specialist map vendors such as Tele Atlas NV. Such devices are also referred to as Portable Navigation Devices (PND's). This map data is specially designed to be used by route guidance algorithms, typically using location data from the GPS system. For example, roads can be described as lines—i.e. vectors (e.g. start point, end point, direction for a road, with an entire road being made up of many hundreds of such segments, each uniquely defined by start point/end point direction parameters). A map is then a set of such road segments, data associated with each segment (speed limit; travel direction, etc.) plus points of interest (POI's), plus road names, plus other geographic features like park boundaries, river boundaries, etc., all of which are defined in terms of vectors. All map features (e.g. road segments, POI's etc.) are typically defined in a co-ordinate system that corresponds with or relates to the GPS co-ordinate system, enabling a device's position as determined through a GPS system to be located onto the relevant road shown in a map and for an optimal route to be planned to a destination.

To construct this map database, Tele Atlas utilises basic road information from various sources, such as the Ordnance Survey (OS) for roads in England. It also includes, but is not limited to, the deployment of a large, dedicated team of vehicles driving on roads, plus personnel checking other maps and aerial photographs, to update and check its data. This data constitutes the core of the Tele Atlas map database. This map database is being continuously enhanced with geo-referenced data. It is then checked and published multiple times a year to device manufacturers like TomTom.

The more information the map database (ie map data) contains then the more information can be used in route planning applications, traffic prediction and the like. However, the map data gathered from sources such as the OS, etc. only provide limited information. Thus, it can be difficult to provide further map data.

Moreover, without further information then it is not possible to increase the utility of the map data for routing, etc.

SUMMARY OF THE INVENTION

According to a first aspect of the invention there is provided a computerised method of creating map data from a plurality of trips where each trip comprises position data derived from the positions of at least one navigation device over a period of time, the method comprising using a processing circuitry to perform the following steps:
i. processing the position data;
ii. determining from the processing a believed accuracy of the position data constituting a trip;
iii. reducing the weight applied to and/or removing position data in which the belief is below a predetermined threshold;
iv. assigning the position data to a lane of a road along which a navigation device traveled during that trip; and
v. generating further map data.

Such a method is believed to be advantageous since it provides both more accurate information and also more granular information thereby providing greater utility for the map data that is generated. For example, embodiments of the invention may enable navigation devices utilising the so generated map data to advise on lane selection. Such lane selection may be based upon traffic conditions or a lane and/or desired route.

The believed accuracy may be determined by processing the variance in position of the points within a trip. The variance may be determined relative to a reference. Determining the variance in this manner allows embodiment of the invention to determine whether there is sufficient confidence in the positions given by that trip (ie if the variance is sufficiently low). If there is not sufficient confidence then the trip and/or individual GPS fixes may be removed from further consideration. In other embodiments, the weighing applied to a trip and/or GPS fix is reduced in further processing if it is determined that there is low confidence.

The reference may be an arbitrary line. In some embodiments, the reference may be any of the following: an edge of a road; a mid line of a road; a line between two carriage ways; or any other suitable reference.

Some embodiments of the invention may also filter the data according to a predetermined characteristic. In one embodiment, the predetermined characteristic may be height information associated with a position. The method may comprises comparing the height provided by the GPS trip for a given point with predetermined height data for that point. Subsequently, that point and/or trip may be disregarded, or at least have its weight reduced, if it is determined that the height of that point, determined by the GPS trip and the predetermined height, varies by more than a predetermined amount.

According to a second aspect of the invention there is provided map data which comprises information relating to lanes of a road.

According to a third aspect of the invention there is provided a machine arranged to create map data, wherein the machine is arranged to receive and process position data from at least one source, the position data comprises the positions of at least one navigation device over a period of time, the machine being arranged to:
i. process the position data;
ii. determine, via the processing of the position data, the believed accuracy of the position data constituting a trip;
iii. reduce the weight and/or remove of position data in which the belief is below a predetermined threshold;
iv. assign the remaining position data to a road along which the navigation device traveled during that trip; and
v. generate map data.

According to a fourth aspect of the invention there is provided a navigation device comprising map data according to the second aspect of the invention and further being arranged to generate guidance as to the lane of a road in which a driver should position his/her vehicle.

According to a fifth aspect of the invention there is provided a machine readable medium containing instructions which when read by a machine cause that machine to perform the method of the first aspect of the invention, carry the map data of the second aspect of the invention or as generated by the method; function as the machine of the third aspect of the invention or as navigation device according to a fourth aspect of the invention.

In any of the above aspects of the invention the machine readable medium may comprise any of the following: a floppy disk, a CD ROM, a DVD ROM/RAM (including a −R/−RW and +R/+RW), a hard drive, a solid state memory (including a USB memory key, an SD card, a Memorystick™, a compact flash card, or the like), a tape, any other form of magneto optical storage, a transmitted signal (including an Internet download, an FTP transfer, etc), a wire, or any other suitable medium.

Further, the skilled person will appreciate that features discussed in relation to any one aspects of the invention are suitable, mutatis mutandis, for other aspects of the invention.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF EMBODIMENTS OF INVENTION

Embodiments of the present invention will now be described with particular reference to a PND (Portable Navigation Device). In particular, in this embodiment, a PND in the context of embodiments of this invention may be a device that is arranged to be carried by a pedestrian. However, this is not exclusively the case and other embodiments may be applied to navigation device associated with other modes of transport.

It should be remembered, however, that the teachings of the present invention are not limited to PND's but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, a map server (such as providing routing and navigation functionality over the internet), or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
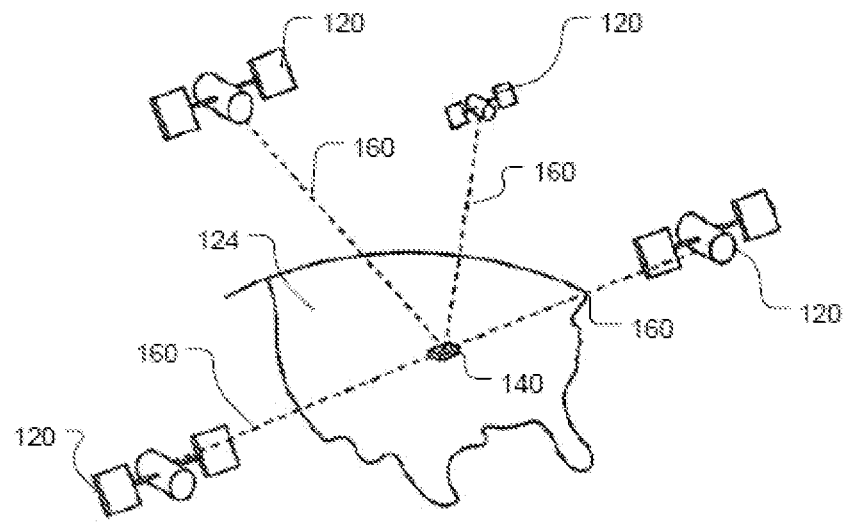
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in precise orbits. Based on these precise orbits, GPS satellites can relay their location to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize an accurate frequency standard accomplished with an accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
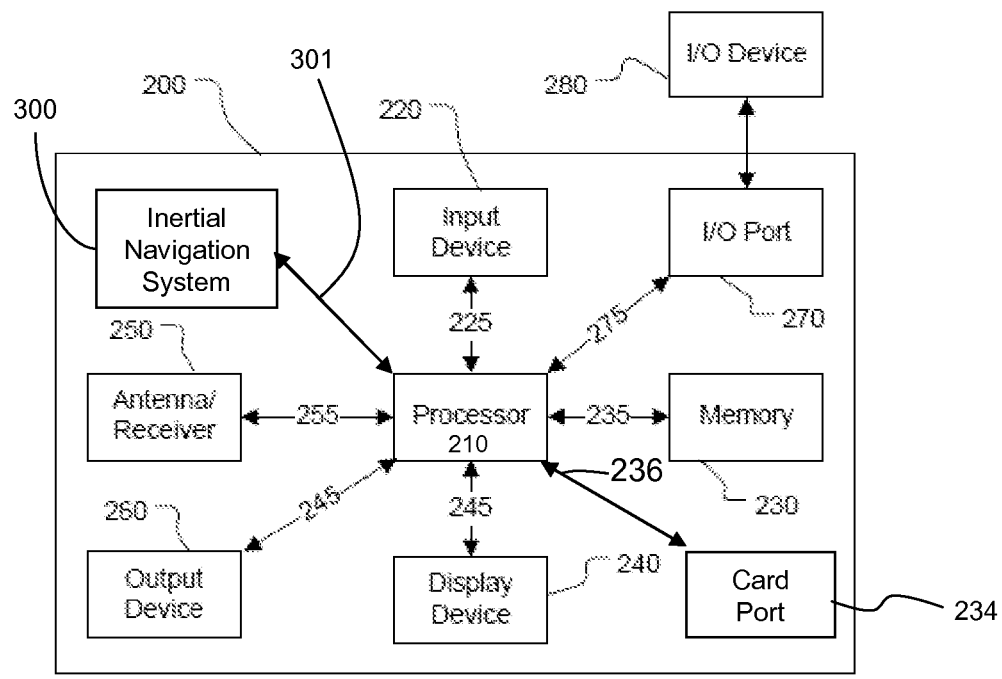
FIG. 2 is a schematic illustration of electronic components arranged to provide a navigation device.

FIG. 2 is an illustrative representation of electronic components of a navigation device 200 according to an embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In one arrangement the input device 220 and display screen 240 are integrated into an integrated input and display device, including a touchpad or touch screen input so that a user need only touch a portion of the display screen 240 to select one of a plurality of display choices or to activate one of a plurality of virtual buttons.

It is should equally be understood that in other embodiments, the input device 240 can include a microphone and software for receiving input voice commands as well.

The navigation device may include an output device 260, for example an audible output device (e.g. a loudspeaker). Such an output device 260 can produce audible information for a user of the navigation device 200.

In the navigation device 200, the processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory.

The processor 210 may also communicate with a card port 234, via a connection 236, into which a removable memory card (commonly referred to as a card) may be added to the device 200. In the embodiment being described the port is arranged to allow an SD (Secure Digital) card to be added. In other embodiments, the port may allow other formats of memory to be connected (such as Compact Flash (CF) cards, Memory Sticks™, xD memory cards, USB (Universal Serial Bus) Flash drives, MMC (MultiMedia) cards, SmartMedia cards, Microdrives, or the like).

The external I/O device 280 may include, but is not limited to an external listening device such as an earpiece for example. As such the external I/O device 280 may include a micro-phone jack socket (such as a 3.5 mm jack socket) to allow a user to use a set of headphones or other head piece in order to hear an output.

The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

In embodiments having a wireless connection this may be provided a Bluetooth chipset arranged to set a Bluetooth channel capable of passing at least audio to a paired device.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable and/or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use. Or indeed the device may be carried by a user as they walk, run, or the like.

Figure 3:
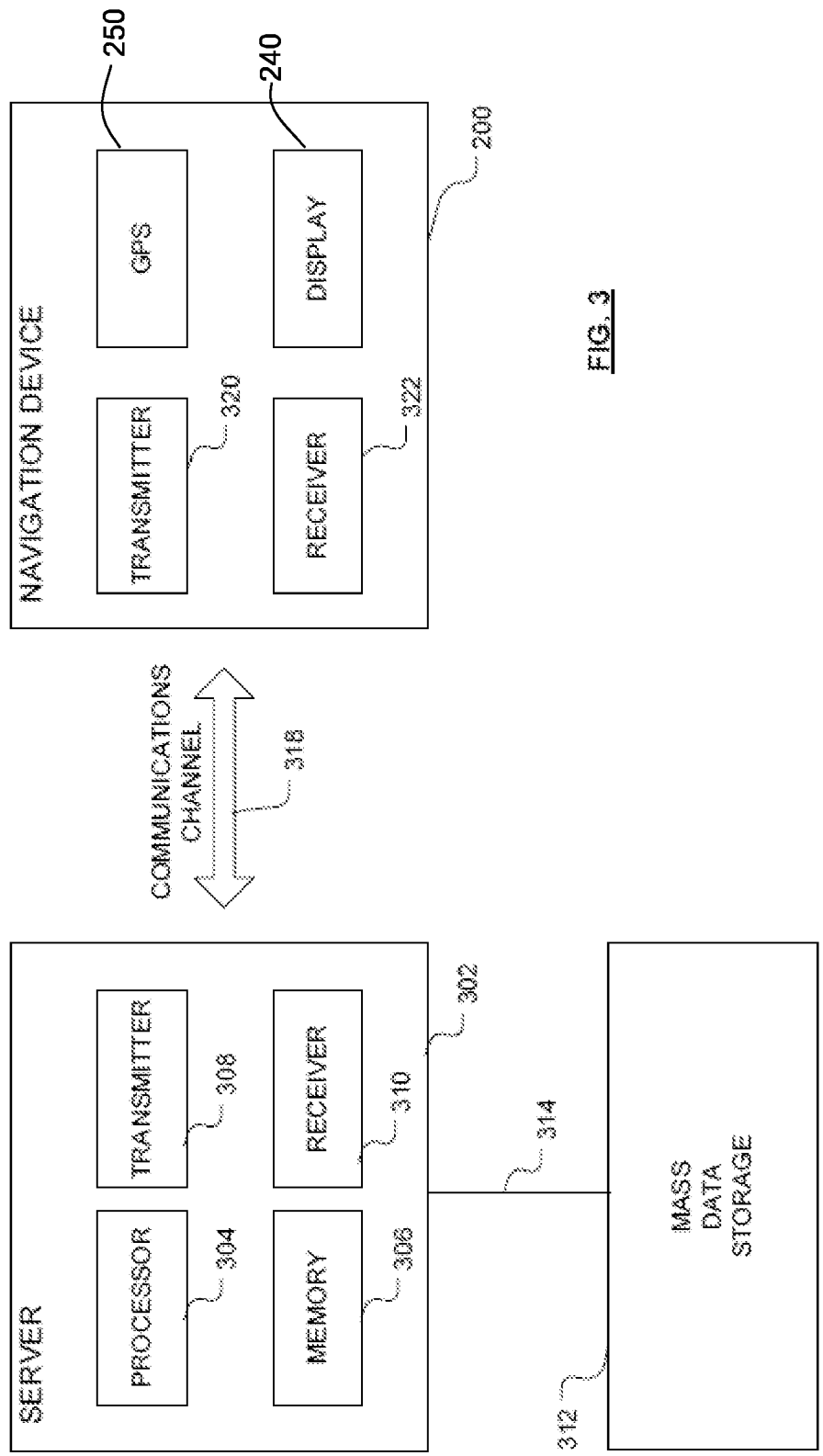
FIG. 3 is a schematic illustration of the manner in which a navigation device may receive information over a wireless communication channel.

Referring now to FIG. 3, in some embodiments, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

In other embodiments, the navigation device 200 may have the necessary circuitry therein to establish the communication channel 318 without the need for an intermediary device such as a mobile telephone or the like. In some embodiments, the navigation device may be a PND having a SIM (Subscriber Identity Module) and associated circuitry. In other embodiments, the navigation device 200 may comprise a mobile telephone.

The establishing of the network connection between the mobile device (via a service provider) and another device such as the server 302, using an Wide Area Network (such as the Internet) for example, can be done in a known manner. This can include use of TCP/IP layered protocol for example. The mobile device can utilize any number of communication standards such as CDMA (Code Division Multiple Access), GSM (Global System for Mobile telecommunications), UMTS (Universal Mobile Telecommunications System), GPRS (General Packet Radio Service), WIFI (the standard IEEE 802.11—any variety thereof), etc.

As such, an internet connection may be utilised which is achieved via data connection, via a mobile phone or mobile phone technology within the navigation device 200 for example. For this connection, an internet connection between the server 302 and the navigation device 200 is established.

The navigation device 200 can further complete a data connection with the mobile device, and eventually with the internet and server 302, via existing Bluetooth technology for example, in a known manner, wherein the data protocol can utilize any number of standards, such as the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In some embodiments, the navigation device 200 may also comprise a gyroscope, a compass or the like 300 which transmits data to the processor 210 via a connection 301. Such embodiments, can allow the processor 210 to track the position of the device 200 whilst it moves in the absence of position data being obtained from the GPS system. Such a gyroscope 300 or the like is often referred to as an Inertial Navigation System (INS).

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

Further, the processor 210 is arranged, from time to time, to upload the record of the whereabouts of the device 200 (ie the GPS data and the time stamp) to the server 302. In some embodiments in which the navigation device 200 has a permanent, or at least generally present, communication channel 318 connecting it to the server 302 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 210 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 230 and/or on a card inserted in the port 234 and to transmit these when a predetermined number have been stored. This predetermined number may be on the order of 20, 36, 100, 200 or any number in between. The skilled person will appreciate that the predetermined number is in part governed by the size of the memory 230/card within the port 234.

In other embodiments, which do not have a generally present communication channel 318 the processor 210 may be arranged to upload the record to the server 302 when a communication channel 318 is created. This may for example, be when the navigation device 200 is connected to a user's computer. Again, in such embodiments, the navigation device may be arranged to buffer the GPS fixes within the memory 230 or on a card inserted in the port 234. Should the memory 230 or card inserted in the port 234 become full of GPS fixes the navigation device may be arranged to deleted the oldest GPS fixes and as such it may be thought of as a First in First Out (FIFO) buffer.

In the embodiment being described, the record of the whereabouts comprises one or more traces with each trace representing the movement of that navigation device 200 within a period which may for example be a 24 hour period. As such, it is convenient if each period is arranged to coincide with a calendar day but in other embodiments, this need not be the case.

Generally, a user of a navigation device 200 gives his/her consent for the record of the devices whereabouts to be uploaded to the server 302. If no consent is given then no record is uploaded to the server 302. The navigation device itself, and/or a computer to which the navigation device is connected may be arranged to ask the user for his/her consent to such use of the record of whereabouts.

The server 302 is arranged to receive the record of the whereabouts of the device and to store this within the mass data storage 312 for processing. Thus, as time passes the mass data storage 312 accumulates a plurality of records of the whereabouts of navigation devices 200 which have uploaded data. It is likely that the server 302 will be in communication with a plurality of such navigation devices 200 and as such will build up a plurality of records from a plurality of devices.

The mass data storage 312 also contains map data. Such map data provides information about the location of road segments, points of interest and other such information that is generally found on map. Where a road segment represents a portion of a map representing a portion of road, or other carriageway, in the area covered by the map.

Figure 4A:
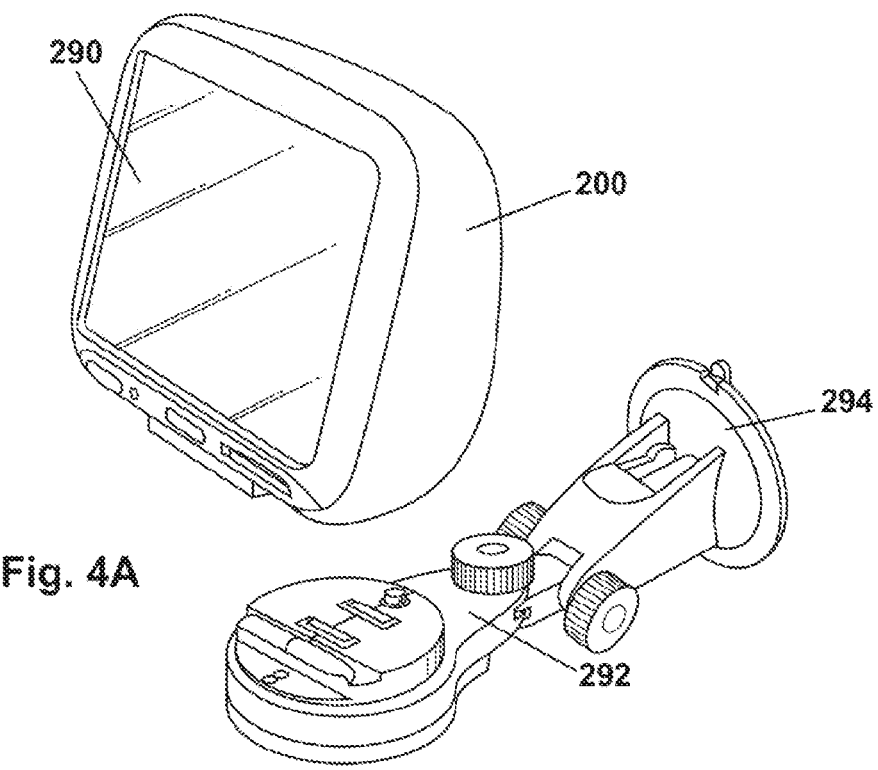
FIGS. 4A and 4B are illustrative perspective views of a navigation device.
Figure 4B:
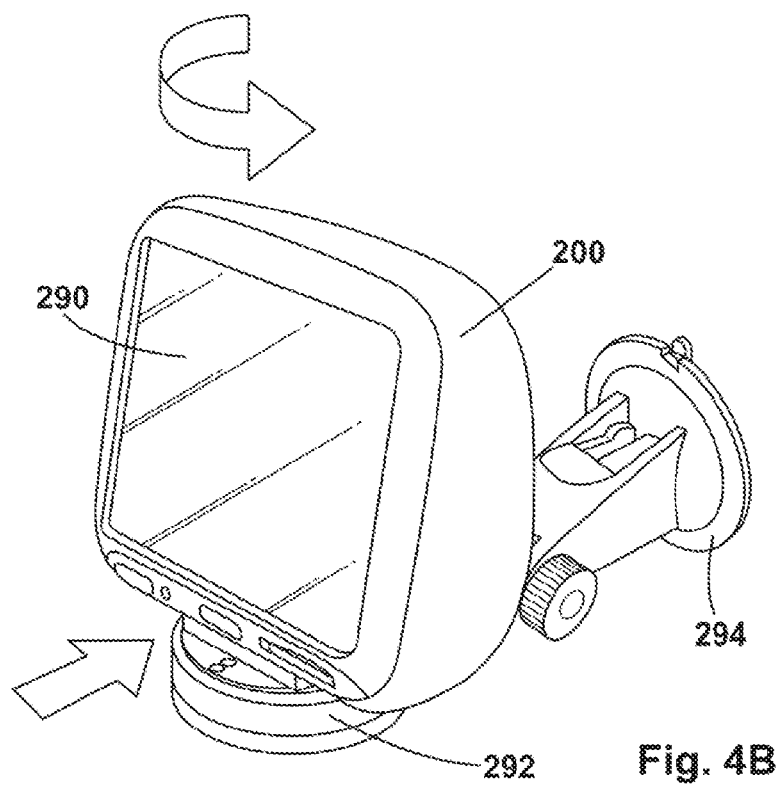

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
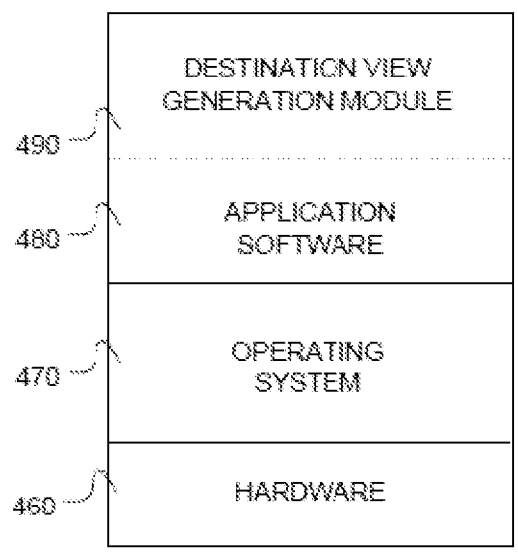
FIG. 5 is a schematic representation of the software employed by the navigation device.

Referring now to FIG. 5, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the Graphical User Interface (GUI) that supports core functions of the navigation device 200, for example map viewing, route planning, navigation functions and any other functions associated therewith.

In use, the data collected by the server 302 builds up a record of the whereabouts of the navigation devices 200 from the data transmitted to it by the navigation devices 200. This data may be thought of as position data. However, the skilled person will appreciate that the data may be uploaded to the server 302 by any suitable mechanism and direct upload from navigation devices 200 is not the only possibility. In other embodiments, the data could be uploaded via a network connection, a machine readable medium, or the like.

Thus, it will be appreciated that the server 302 builds up a database of map data as the navigation device 200 is used. Each trip of such a navigation device 200 generates a set of position data comprising a plurality of points which are provided by GPS fixes and give the position of the navigation device 200 from time to time. The server 302 subsequently matches each of the positions to the map data to which it has access.

Figure 6:
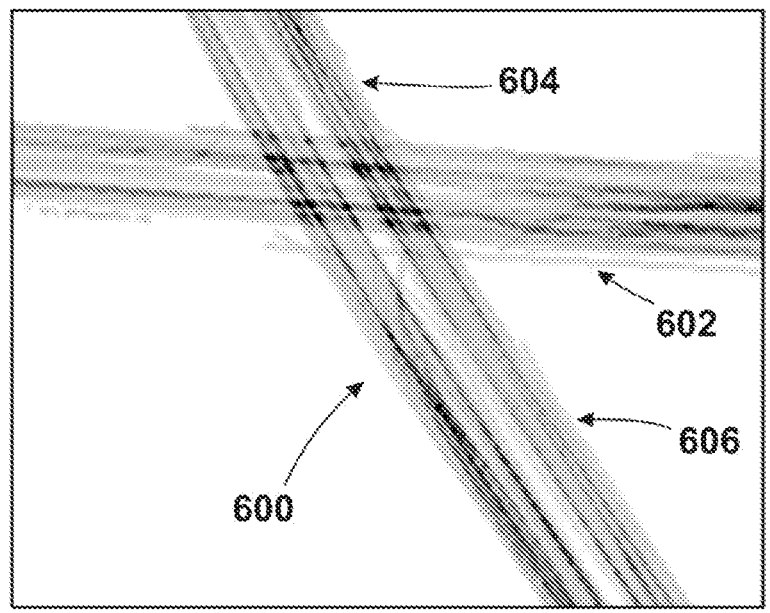
FIG. 6 shows traces of trips made by vehicles containing navigation devices.

However, the skilled person will appreciate, and it is exemplified in FIG. 6, that many roads contain a plurality of lanes along which a vehicle travel. As such, should a navigation device 200 be mounted within a vehicle then that device may move between lanes. FIG. 6 shows regions in which lane changes frequently occur 600, 602. Each black line on FIG. 6 represents the position data provided by the position data within a trip received by the server 302. Other regions 604, 606 of FIG. 6 show regions in which there are no lane changes and the trips are represented by substantially parallel lanes. As such, and in views of the high number of lane changes, it is difficult to determine in which lanes a navigation device was travelling when passing through regions 600, 602.

From the discussion above, it will be appreciate that a single GPS fix, contains information about absolute position (ie the longitude and latitude) and also about the altitude of the navigation device when that GPS fix is recorded. However, the server 302 contains map data that gives the altitude of the location at which the GPS fix is recorded.

Figure 9:
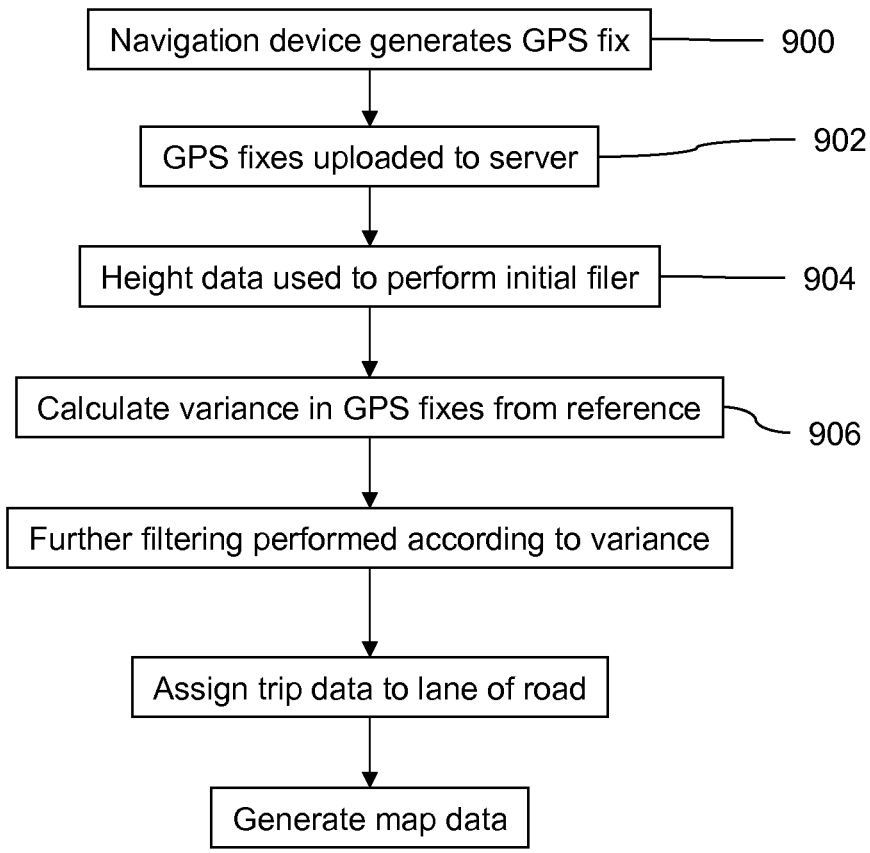
FIG. 9 depicts a flow diagram showing a method according to an embodiment of the invention.

A method of one embodiment of the invention is described in relation to FIG. 9 and it is seen that the initial stage 900 comprises generating the trips which are constituted by the GPS fixes 900 and uploading these trips to the server 302 in step 902.

Next, in step 904, the height information of a GPS fix is compared to the local height information contained within the map data and filtering is applied to any GPS fixes that show a wide variance from the height information contained within the map data. It has been found that if there is a large variance in the height information then there is also likely to be a large variance in the longitude and latitude. As such, that trip and/or GPS fix may be removed from subsequent processing. Or at least the weight of that GPS trip and/or fix is reduced in subsequent processing. In the embodiment being described, it is just the GPS fix that is apparently in error which is removed or at least has its weight reduced.

In some embodiments, the navigation device 200 which generates the GPS fixes may be arranged to filter GPS fixes as they are collected. It will be appreciated that a navigation device may be contain local height information and as such may be arranged to provide an initial filter. However, such filtering may also be performed by the server 302 or other machine arranged to process the trips. In the embodiment being described, it is the server 302 that performs the filtering.

Figure 7A:
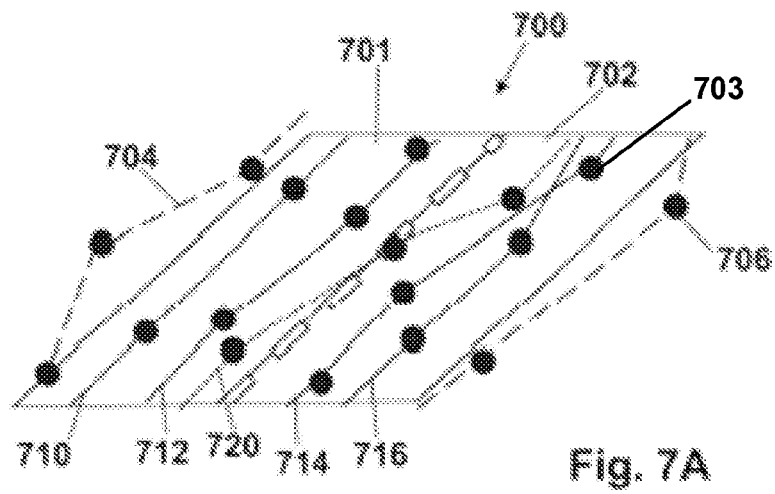
FIGS. 7A and 7B schematically show possible trips that might be taken by a navigation device across a section of dual carriage way together with associated probabilities.
Figure 7B:
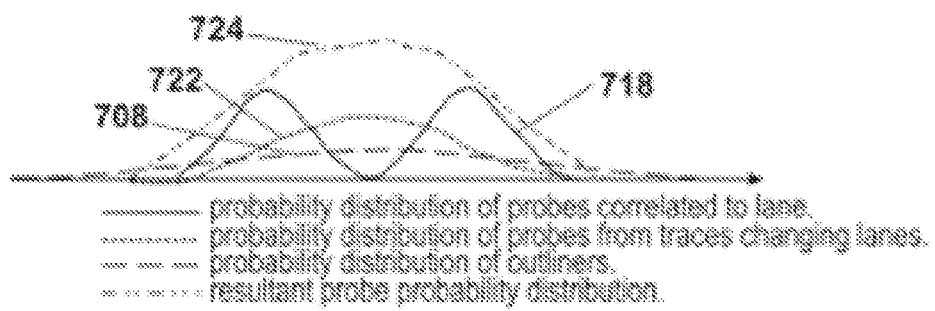

FIG. 7 is now used to explain further the trip data shown on FIG. 6 and FIG. 7*a* shows a road 700 having a carriageway having two lanes 701, 702. FIG. 7*b* shows the probability distribution for the various occurrences that are now discussed. Within FIG. 7*a* GPS fixes that go to make up a trip are shown by a dot (eg. 703) within the trip as explained hereinafter.

In the position data that is processed, it is possible for the GPS fixes to be inaccurate and have a high degree of error; ie to be a so-called outlier. Trips containing such outliers are represented by the dashed line 704, 706 in FIG. 7*a* and the dashed bell curve 708 in FIG. 7*b*. Such outliers give a position for the navigation device 200 which is likely to be in error since it is outside the boundaries of the road 700. It would also be possible for an outlier GPS fix to be within the boundary of the road 700 but within the wrong lane 701, 702. As such, a low probability is displayed for the occurrence of the trips 704, 706.

FIG. 7*a* also shows trips 710, 712, 714 and 716 which generally stay within a lane 701, 702. FIG. 7*b* shows the probability function for this at 718 and it can be seen that there are two peaks to this curve; one relating to each lane 701, 702.

Trip 720 represents the path of a navigation device 200 that moved between the two lanes 700, 702; ie it traverses lanes. Again, this has a probability function as shown in FIG. 7*b* at 722. It can be seen that this trip 722 has a higher probability than the probability function 708 representing the outliers 704, 706. However, the probability function 722 has a lower probability function when compared to the function for the overall road 724 as discussed hereinafter.

FIG. 7*b* also shows an overall probability function 724 for the trips along the road. The function 724 is a mixture of the Gaussian distributions from the other functions. The weight of the curve 718 is of reduced weight and as such the curve 724 does not contain a plurality of peaks.

Figure 8:
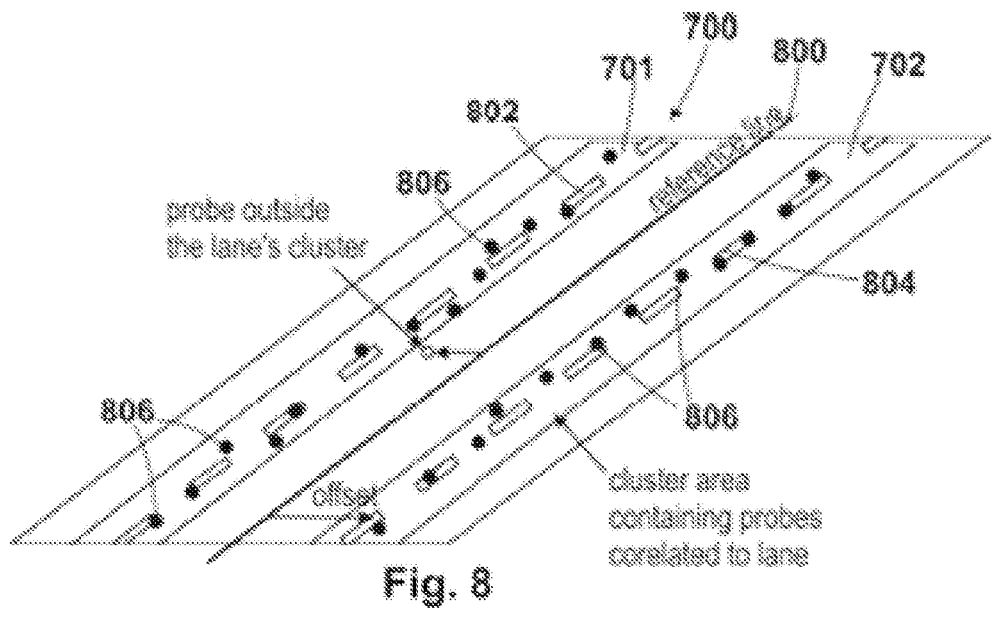
FIG. 8 schematically exemplifies a method according to an embodiment of the invention.

This phenomenon is described further with reference to FIG. 8 which shows a reference line 800 between the two lanes 701, 702 of a road, which in this example is a single carriage way road. However, similar principles may be applied to dual carriage roads or to roads with any number of lanes. For example, embodiments of the invention may be applied to roads having 1, 2, 3, 4, 5 or more lanes in any given direction.

FIG. 8 shows two trips along the road 700 wherein the GPS fixes of each trip are shown by a dot 806. It can be seen that the GPS fixes within a trip vary about centre lines 802, 804 for that lane but that they are relatively constant distance from the reference line 800.

FIG. 8 shows an example of an outlying GPS fix at reference 808 and it can be seen that this is at a closer distance to the reference line 800 than the other GPS fixes for the trip along lane 701. As such, the distance to the reference line may be used to determine whether or not a GPS fix is outlying. It could of course be that an outlying position may be further away from the reference line 800.

Thus, in the example of FIG. 8 (and also for the examples of a probe that does not change lane (eg trips 710, 712, 714 and 716 in FIG. 7) then these are characterized by almost constant distance to reference line (offset) and low variance of this value (lower than half of the lane width).

Thus, looking at the variance of the position data with the trips, together with a reference line associated with the navigable segment the variance of the GPS fixes of a trip can be used to determine the accuracy of the that trip. Thus, the method generates non overlapped probe clusters with mean values equal to the offset of a lane from which the data was generated to the reference line 800. Additionally comparing offset of GPS fixes to a cluster allows a trip to be removed from further consideration, or at least the weighting of that data to be reduced, for traces in which the analysis shows that the navigation device 200 has changed lane.

Thus, the method being described calculates (906) the variance of the location to a reference 800 within the GPS fixes of a trip. Further filtering is then performed on the trip according to this variance and trips having a high variance are removed from further consideration or at least have their weight reduced in subsequent processing. Thus, as a result of this filtering, there is a higher confidence in the trip data that remains; ie the quality of the data has been increased. Some embodiments may remove GPS fixes that are believed to be in error rather than whole trips.

Thus embodiments of the invention may allow the accuracy of data for a road 700 to be increased such that outliers and trips that change lane can be removed or have reduced weight applied to them. In some embodiments, this increased accuracy of the data may allow further information about the road (or other carriageway) to be derived from the position data. For example, embodiments, may allow the number of lanes for a given road to be determined, traffic speed for a given lane, etc.

Further, lane information also find utility in Advanced Driver Assistance Systems (ADAS) which may give guidance to a driver as to the lane in which he/she should drive.

Some embodiments of the idea may then, in subsequent processing of the trips to assign data to a given lane of the road (or other carriageway) that the trip represents. This therefore allows data to be generated at lane level rather than for the carriageway as a whole. In particular, the trip data assigned to a particular lane allows the traffic flow distribution and it characteristics across the road to be determined. The skilled person will appreciate that this may well vary from lane to lane.

In another step of the method map data is generated in which the lane specific information has been incorporated. Such map data may be used in various embodiments which are now discussed further. In other embodiments, map data may simply be generated in which the accuracy of data associated with road segments has been increased when compared to prior art methods. Map data generated in this manner may include information that has been derived from the filtered position data. Such map data may also include information about whether the lane is for a predetermined class of vehicle (eg busses, taxis, etc), whether there must be greater than a predetermined number of people within a vehicle to use that lane (eg a car pool lane).

In some embodiments, it is possible to perform such processing in a real time, or at least a pseudo real time basis, in which position data uploaded from a navigation device 200 is used to provide so-called real time traffic information. However, the skilled person will appreciate that real time in such embodiments is likely to mean a delay of at least several seconds and may be a delay of several minutes. However, such so-called real time data may prove useful in giving drivers useful data on road conditions.

Further, other embodiments of the invention may be used to provide so-called lane assist information to users of devices which give that user information about which lane to position themselves (for example in ADAS systems). This may be advantageous as a user is approaching an intersection. For example, it is often the case that some lanes are restricted to traveling such that users in that lane are expected to travel in a predetermined direction. However, it can often be the case that this is not apparent to a driver until relatively late which can make changing lanes more difficult. As such, advanced information about the lane location can make driving for that user safer and more convenient.

Also, the speed of transit along a particular road segment may vary from lane to lane across a road. As such, information may be given to a user to help optimize his/her journey.

The skilled person will appreciate that the stage of map generation may be an optional feature of embodiments of the invention.

The invention claimed is:

1. A computerised method of creating map data, comprising:
processing, using a processor, sets of position data derived from the positions of a plurality of mobile devices moving along a section of road having two or more lanes with same direction of travel, wherein each set of position data comprises a plurality of points representative of the position of a mobile device over a period of time, and wherein the processing of a set of position data comprises:
determining an offset value for each point, the offset value being the distance between the point and a predetermined reference line; and
determining a variance of the offset values for the points in the set;
filtering the sets of position data by removing or reducing the weight applied to sets of position data having a variance above a predetermined value to generate filtered position data, said filtering further comprising comparing altitude information associated with one or more points in the sets of position data to a previously determined height for the one or more points, and removing or reducing the weight applied to sets of position data if the altitude information varies by more than a predetermined amount from the previously determined height;
deriving information about lanes of the road based upon the filtered position data; and
generating map data using the derived information.

2. The method of claim 1, wherein the reference line comprises an edge of the road or a mid line of the road.

3. The method of claim 1, wherein the information about lanes of the road comprises one or more of:
(i) the number of lanes;
(ii) speed data for at least one of the lanes;
(iii) traffic flow data for at least one of the lanes; and
(iv) a class of vehicle that can use one of the lanes.

4. The method of claim 3, wherein the determination of the speed data occurs in real-time or pseudo real-time.

5. The method of claim 3, wherein the determination of the number of lanes is used by an Advanced Driver Assistance System.

6. The method of claim 1, wherein the altitude information is associated with a GPS fix.

7. The method of claim 1 further comprising generating probe clusters having means values equal to an offset of a lane associated with the predetermined reference line.

8. The method of claim 7, wherein the probe clusters are non-overlapping.

9. The method of claim 1 further comprising using the map data to generate guidance as to the lane of a road in which a driver should position their vehicle.

10. A machine arranged to create map data, comprising at least one processor arranged to:
process sets of position data derived from the positions of a plurality of mobile devices moving along a section of road having two or more lanes with same direction of travel, wherein each set of position data comprises a plurality of points representative of the position of a mobile device over a period of time, and wherein the processing of a set of position data comprises:

determining an offset value for each point, the offset value being the distance between the point and a predetermined reference line; and determining a variance of the offset values for the points in the set;

filter the sets of position of data by removing or reducing the weight applied to sets of position data having a variance above a predetermined value to generate filtered position data, said filtering further comprising comparing altitude information associated with one or more points in the sets of position data to a previously determined height for the one or more points, and removing or reducing the weight applied to sets of position data if the altitude information varies by more than a predetermined amount from the previously determined height;

derive information about lanes of the road based upon the filtered position data; and generate map data using the derived information.

11. A non-transitory machine readable medium containing instructions which when read by a machine cause that machine to perform the method of creating map data, the method executed by the set of instructions comprising:

processing sets of position data derived from the positions of a plurality of mobile devices moving along a section of road having two or more lanes with same direction of travel, wherein each set of position data comprises a plurality of points representative of the position of a mobile device over a period of time, and wherein the processing of a set of position data comprises:

determining an offset value for each point, the offset value being the distance between the point and a predetermined reference line; and determining a variance of the offset values for the points in the set;

filtering the sets of position data by removing or reducing the weight applied to sets of position data having a variance above a predetermined value to generate filtered position data, said filtering further comprising comparing altitude information associated with one or more points in the sets of position data to a previously determined height for the one or more points, and removing or reducing the weight applied to sets of position data if the altitude information varies by more than a predetermined amount from the previously determined height;

deriving information about lanes of the road based upon the filtered position data; and generating map data using the derived information.

* * * * *